(12) United States Patent
Seidl et al.

(10) Patent No.: US 10,567,370 B2
(45) Date of Patent: *Feb. 18, 2020

(54) CERTIFICATE AUTHORITY

(71) Applicant: NOKIA SOLUTIONS AND NETWORKS OY, Espoo (FI)

(72) Inventors: Robert Seidl, Konigsdorf (DE); Norbert Goetze, Eichenau (DE); Markus Bauer-Hermann, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,689

(22) Filed: Apr. 20, 2018

(65) Prior Publication Data

US 2018/0241740 A1    Aug. 23, 2018

Related U.S. Application Data

(63) Continuation of application No. 13/638,300, filed as application No. PCT/EP2010/054392 on Apr. 1, 2010, now Pat. No. 9,979,716.

(51) Int. Cl.
*H04L 29/06* (2006.01)
*H04L 9/00* (2006.01)
*H04L 9/32* (2006.01)

(52) U.S. Cl.
CPC .......... *H04L 63/0823* (2013.01); *H04L 9/006* (2013.01); *H04L 9/3268* (2013.01); *H04L 63/102* (2013.01)

(58) Field of Classification Search
CPC ... H04L 63/0823; H04L 9/3268; H04L 9/006; H04L 63/102
See application file for complete search history.

(56) References Cited

U.S. PATENT DOCUMENTS 7,512,785 B2   3/2009  Brickell
7,543,140 B2   6/2009  Dillaway et al.
7,581,106 B1   8/2009  Das et al.
(Continued)

FOREIGN PATENT DOCUMENTS

CN   101202762 A   6/2008
CN   101242263 A   8/2008
(Continued)

OTHER PUBLICATIONS

International Search Report ans Written Opinion dated Mar. 24, 20111 corresponding to International Patent Application No. PCT/EP2010/054392. (No copy provided, per MPEP 609. Copy submitted in parent U.S. Appl. No. 13/638,300).
(Continued)

*Primary Examiner* — Saleh Najjar
*Assistant Examiner* — Feliciano S Mejia
(74) *Attorney, Agent, or Firm* — Squire Patton Boggs (US) LLP

(57) ABSTRACT

A protocol for issuing and controlling digital certificates is described in which an identity management system is used to identify a user requesting a digital certificate and is also used to issue the digital certificate itself. Accordingly, an IDM-based PKI system is provided.

9 Claims, 3 Drawing Sheets

(56) References Cited

U.S. PATENT DOCUMENTS

| | | | |
|---|---|---|---|
| 8,010,786 B1 * | 8/2011 | Ward | H04L 63/20 |
| | | | 713/156 |
| 8,069,256 B2 | 11/2011 | Rasti | |
| 8,140,340 B2 | 3/2012 | Bhogal et al. | |
| 8,327,424 B2 * | 12/2012 | Ignaci | H04L 63/0823 |
| | | | 713/156 |
| 8,375,213 B2 | 2/2013 | Borneman et al. | |
| 8,386,785 B2 * | 2/2013 | Kim | H04L 63/0823 |
| | | | 713/158 |
| 8,578,467 B2 * | 11/2013 | Ronda | H04L 63/0853 |
| | | | 713/172 |
| 8,769,291 B2 * | 7/2014 | Schneider | H04L 63/0823 |
| | | | 713/175 |
| 8,898,457 B2 * | 11/2014 | Fu | H04L 63/0807 |
| | | | 713/156 |
| 2005/0076198 A1 | 4/2005 | Skomra et al. | |
| 2005/0114367 A1 | 5/2005 | Serebrennikov | |
| 2007/0079113 A1 * | 4/2007 | Kulkarni | H04L 63/0492 |
| | | | 713/150 |
| 2007/0283426 A1 * | 12/2007 | Houssier | H04L 63/0823 |
| | | | 726/6 |
| 2009/0092247 A1 * | 4/2009 | Kido | H04L 63/062 |
| | | | 380/30 |
| 2009/0307486 A1 * | 12/2009 | Grajek | H04L 63/0272 |
| | | | 713/156 |
| 2011/0213965 A1 | 9/2011 | Fu et al. | |

FOREIGN PATENT DOCUMENTS

| | | |
|---|---|---|
| CN | 101645900 A | 2/2010 |
| EP | 1162778 A2 | 12/2001 |
| EP | 1881665 A1 | 1/2008 |
| WO | 2010/051833 A1 | 5/2010 |

OTHER PUBLICATIONS

ETSI TS 133 221 V9.0.0 (Feb. 2010), Digital cellular telecommunications system (Phase 2+); Universal Mobile Telecommunications System (UMTS); LTE; Generic Authentication Architecture (GAA); Support for subscriber certificates (3GPP TS 33.221 version 9.0.0 Release 9), Technical Specification, Feb. 1, 2010, XP014045950, pp. 1-26. (No copy provided, per MPEP 609. Copy submitted in parent U.S. Appl. No. 13/638,300).

First Office Action dated Jul. 1, 2014 corresponding to Chinese Patent Application No. 201080066049.7. (No copy provided, per MPEP 609. Copy submitted in parent U.S. Appl. No. 13/638,300).

* cited by examiner

CERTIFICATE AUTHORITY

CROSS-REFERENCE TO RELATED APPLICATION

This application is a Continuation Application of co-pending application Ser. No. 13/638,300, filed on Sep. 28, 2012, which is the national stage application based on PCT International Application No. PCT/EP/2010/0543952, filed on Apr. 1, 2010. The entire disclosure of the earlier application are hereby incorporated herein by reference.

The present invention is directed to certificate authorities that are used to issue digital certificates, typically for use with public key cryptography algorithms.

Public key cryptography is a well-established technique that uses asymmetric keys to provide security. As is well known in the art, a public and private key pair can be generated in which the private key is kept secret, but the public key can be widely publicised. Any message encrypted using a particular public key can only be decrypted using the corresponding private key. Similarly, any message encrypted using a particular private key can only be decrypted using the corresponding public key. Importantly, the public and private keys are related mathematically, but the private key cannot be feasibly derived from the public key. Therefore, knowledge of the public key does not enable the private key to be determined.

FIG. 1 shows a system, indicated generally by the reference numeral 1, comprising a first user 2 and a second user 4. The first user has an encryption module 6: the second user has a decryption module 8. As shown in FIG. 1, the encryption module 6 of the first user has a first input receiving a message M and a second input receiving a first key Key1. The encryption module has an output that provides the message M in encrypted form. The output of the encryption module 6 is used as a first input to the decryption module 8 of the second user 4. The decryption module 8 has a second input receiving a second key Key2 and has an output.

If the first key is the private key of the first user 2, then the encrypted message output by the encryption module 6 can be decrypted by any decryption module that knows the public key of the first user. Thus, if the second key is the public key of the first user, then the output of the decryption module will be the message M. In this scenario, the encryption of the message M proves that the first user has the private key that matches the public key of the first user and therefore provides good evidence of the identity of the first user. This form of encryption is often referred to as a digital signature.

Similarly, if the first key is the public key of the second user 4, then the encrypted message output by the encryption module 6 can only be decrypted by a decryption module that knows the private key of the second user. Thus, if the second key is the private key of the second user, then the output of the decryption module will be the message M. In this scenario, the encryption of the message M ensures that the message can only be read by someone in possession of the private key of the second user. This form of encryption is often referred to as public-key encryption.

Given that public and private key pairs can be used to prove the identity of users, the security of the keys is crucial if third parties are to trust the key system. One known approach to increasing trust in public and private key pairs is the use of a public-key infrastructure (PKI) system.

A public-key infrastructure (PKI) is an arrangement that binds public keys and user identities. This is achieved using a certificate (or certification) authority (CA). A certificate authority (sometimes referred to as a "trusted third party") issues public key certificates associated with a particular user identity. In order to do so, the user needs to prove their identity to the satisfaction of the certification authority. Thus, in a PKI system, the level of trust that a third party has that a particular public key relates to a particular identity is dependent on the level of trust that that third party has in the certificate authority that issued the public key certificate.

Certificate handling requires at least some technical know-how from both the users/clients and the service providers in setting up the public key infrastructure (PKI) as well as deploying and protecting it. Typically, client certificates and client private keys are stored in the client hardware and therefore are not easily transported, can be insecure and are not typically user-friendly. Signing the client certificates is normally done offline by a root certificate authority (CA) and takes time, because the root certificate authority needs to verify the identity of the clients. A number of companies are available to act as public root certificate authorities, but such companies charge their customers for signing their certificates; accordingly, even an expert user is required to pay additional fees.

There are several tools like OpenSSL, SSL or Java Keytool available in the market. These tools can generate a private key and, with this key, create a CSR (Certificate Signing Request) which is eventually saved at a medium (e.g. memory stick). To identify the user, mechanisms like post-ident are necessary. This solution discloses some security risks.

The present invention seeks to address at least some of the problems outlined above.

The present invention provides a method comprising: providing an input to enable a user to manage one or more digital certificates for the user; using an identity management system to identify the user; and using the identity management system to sign and control said one or more digital certificates for the user. The management of the digital certificates typically takes the form of signing and controlling digital certificates for the user.

The present invention also provides an identity management system comprising: a first input for enabling a user to manage one or more digital certificates for the user (e.g. by requesting the issuance/signing of a digital certificate or by requesting the revocation of a digital certificate); an identification module for identifying the user; and a certificate module adapted to sign and control said one or more digital certificates for the user.

Thus, the present invention provides a certificate signing/generation/handling protocol in which an identity management system is used to provide/generate/revoke certificates (operating as a certificate authority). The present invention therefore enables an IDM-based PM system.

The invention provides a means for a relatively quick and easy solution for providing certificates.

The said input may be provided using a graphical user interface. This provides the user with a simple means for interacting with the apparatus and method of the present invention.

The identity management system is typically able to sign multiple digital certificates for the user (typically at the request of a user).

The (or each) digital certificate for the user may include a subset of available attributes for the user. In some forms of the invention, the user specifies at least some attributes to be included in a particular digital certificate. In some forms of the invention, the user specifies at least some attributes to be excluded from a particular digital certificate.

The (or each) digital certificate for the user may include at least some attributes that are added by the identity management system. At least some of the attributes inserted by the identity management system may be inserted without requiring input from the user. The identity management system may, for example, insert attributes such as the user's age or date of birth, or an indication of whether or not the user is under 18. The identity management system may add the fully qualified domain name (FQDN) of the IDM system.

The identity management system may be responsible for checking that attributes requesting for inclusion by the user are correct. If such attributes are not correct, the identity management system may refuse to sign the certificate. By way of example, if the user requests that an attribute indicating that the user has an age>18 be included in the certificate, the identity management system should not sign such a certificate if the attribute is untrue. Often the IDM checks the validity of all attributes that a user wants to include in a particular certificate.

The identity management system may be able to revoke one or more digital certificates. Certificate revocation may, for example, be on request from the user. Certification revocation may, for example, be time-dependent; for example, a particular certificate may have a validity duration, after which the certificate should be revoked.

The present invention also provides a method comprising: generating a certificate signing request, the request including a public key for the user; authenticating the user at an identity management system; sending the certificate signing request to the identity management system; and receiving a digital certificate from the identity management system in response to the certificate signing request. Of course, the order of these steps may be different to the order in which the steps are presented above; by way of example, the certificate signing request may be sent before the user is authenticated by the identity management system.

The present invention further provides a device comprising: means for generating a certificate signing request, the request including a public key for the user; means for requesting authentication of the user at an identity management system; means for sending the certificate signing request to the identity management system; and means for receiving a digital certificate from the identity management system in response to the certificate signing request.

The digital certificate is typically signed by the private key of the IDM. The digital certificate typically includes the public key of the IDM in unencrypted form. Thus, the digital signature can readily be decrypted using the public key of the IDM to extract the identity and public key of the user, together with any attribute or other data included in the digital certificate.

The invention may include generating a public and private key pair for a user, wherein said public key is the public key included in said certificate signing request.

The certificate signing request may include details of one or more user attributes to be included in the digital certificate. The certificate signing request may include details of one or more user attributes to be excluded from the digital certificate.

An interface (e.g. a GUI) may be provided to enable the user to indicate the user attributes that should and/or should not be included in the digital certificate. This could, for example, be provided in the form of a check list or a drop-down list of available options, where the user can easily indicate which attributes should and/or should not be included in the certificate.

The attributes may be "fuzzed". This enables a user to provide attribute data that is less precise than the full attribute data, for example for privacy reasons. By way of example, instead of entering the precise address of the client into the certificate signing request, a location fuzzing would be allowed (District or Town/City or Country only). The IDM system could be used to check if what the client reveals (the less precise "fuzzed" data) is correct.

The identity management system may be able to sign multiple digital certificates for the user (typically at the request of a user).

The present invention further provides a computer program comprising: code (or some other means) for providing an input to enable a user to manage one or more digital certificates for the user (this management typically taking the form of signing and controlling digital certificates for the user); code (or some other means) for using an identity management system to identify the user; and code (or some other means) for using the identity management system to sign and control said one or more digital certificates for the user. The computer program may be a computer program product comprising a computer-readable medium bearing computer program code embodied therein for use with a computer.

The present invention yet further provides a computer program comprising: code (or some other means) for generating a certificate signing request, the request including a public key for the user; code (or some other means) for authenticating the user at an identity management system; code (or some other means) for sending the certificate signing request to the identity management system; and code (or some other means) for receiving a digital certificate from the identity management system in response to the certificate signing request. The computer program may be a computer program product comprising a computer-readable medium bearing computer program code embodied therein for use with a computer.

Exemplary embodiments of the invention are described below, by way of example only, with reference to the following numbered drawings.

The inventors of the present invention have realised that many of the problems associates with prior art certificate signing and handling protocols can be addressed by using an identity management system to provide and handle certificates, thereby providing an IDM-based PKI. As discussed in detail below, the solution combines high levels of security with high levels of flexibility. For example, the system of the present invention is flexible enough to revoke certificates e.g. if a user is not creditworthy or reliable anymore. Also, the certificate can be complemented with attributes relating to the user (such as the user's date of birth) which can be verified by the IDM.

"Identity management" describes a variety of technologies that serve to enable the portability of identity information across otherwise autonomous security domains. A goal of identity management (sometimes referred to as identity federation) is to enable users of one domain to access data or systems of another domain seamlessly and securely, and without the need for redundant user administration. Eliminating the need for repeated login procedures each time a new application or account is accessed can substantially improve the user experience.

As discussed above, in order to enable a certificate authority to issue public key certificates associated with a particular user identity, the user needs to prove their identity to the satisfaction of the certification authority. The inventors have realised that the existing ability of identity management systems can be exploited by using identity management systems to issue and manage digital certificates, i.e. to operate as a certification authority. Thus, an advantage of using an IDM for user authentication purposes is that the IDM does not need post-ident or other similar mechanisms to verify a person. Rather, the IDM can use a previously authenticated session to check a user against the database and store a newly generated digital certificate there. Thus, the operator of the IDM has established his own PKI.

Figure 1:
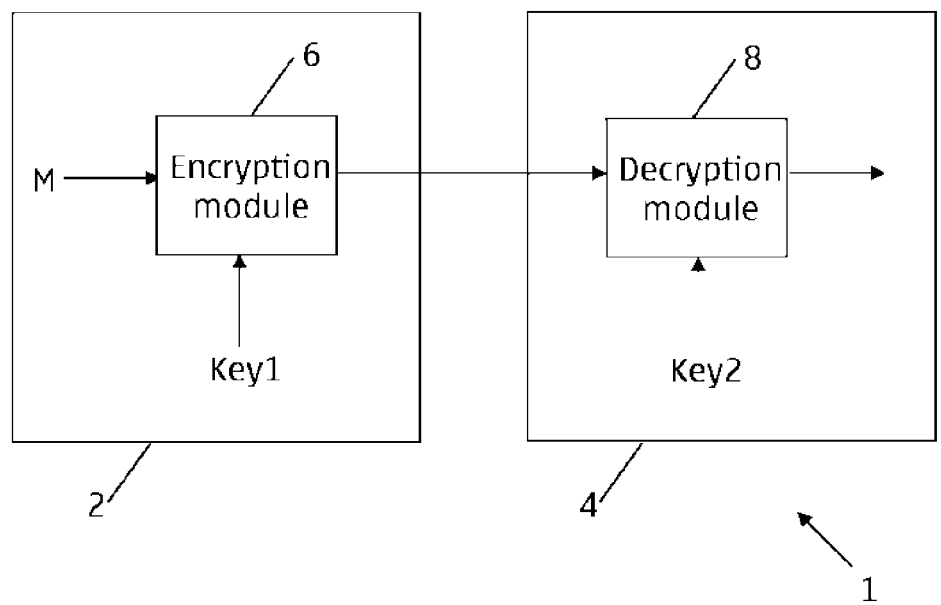
FIG. 1 is a block diagram of a system demonstrating the use of public and private keys.
Figure 2:
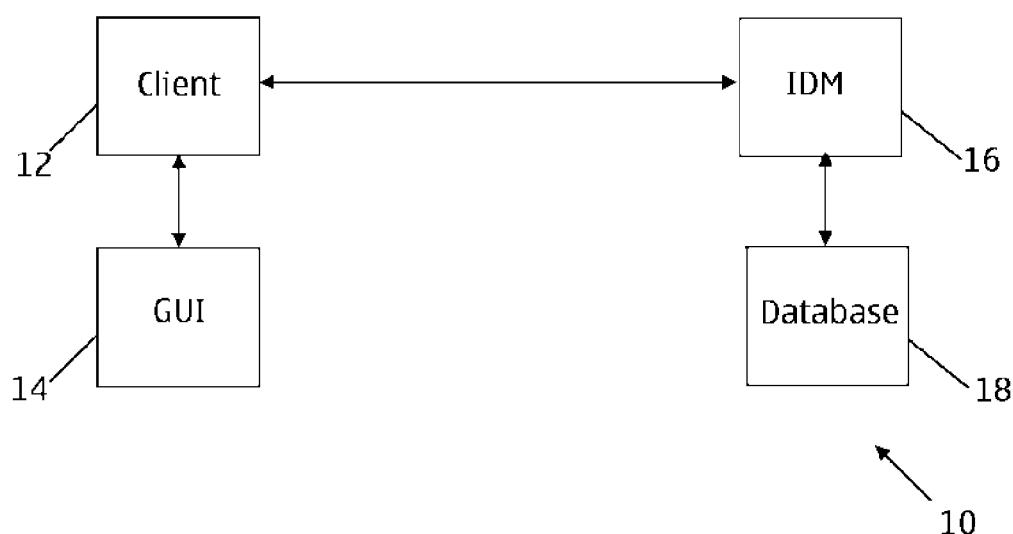
FIG. 2 is a block diagram of a system in accordance with an aspect of the present invention.

FIG. 2 is a block diagram of a system, indicated generally by the reference numeral 10, of a system in accordance with an aspect of the present invention. The system 10 comprises a client 12 (typically in the form of a software module), a graphical user interface (GUI) 14 for the client, an identity management (IDM) system 16 and a database 18. The client 12 is in two-way communication with the GUI 14 and the IDM 16. The IDM is also in two-way communication with the database 18.

Figure 3:
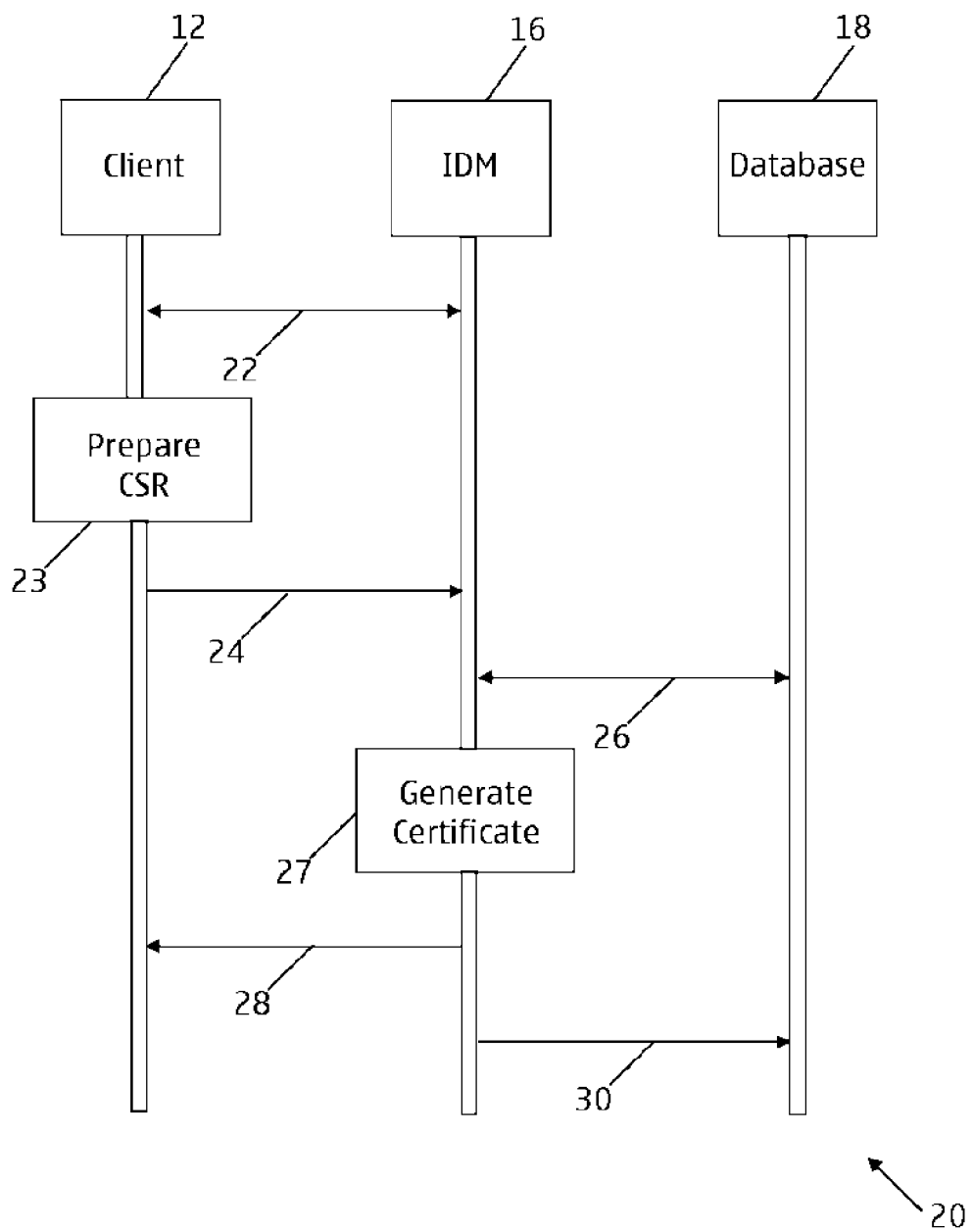
FIG. 3 shows a message sequence in accordance with an aspect of the present invention.

FIG. 3 is a message sequence, indicated generally by the reference numeral 20, showing an exemplary use of the system 10.

The message sequence 20 starts at step 22, where the client 12 is authenticated at the IDM 16. There are a variety of mechanisms that can be used to authenticate a user at an IDM. The user of a username and password pair and the use of data stored, for example, in a SIM module are two of many examples. The skilled person would be aware of many options for implementing this step of the message sequence 20. The means used to implement the authentication step 22 is not an essential feature of the present invention.

After identification, the client 12 generates a certificate signing request (CSR) at step 23 of the message sequence 20. In order to generate the CSR, a public and private key pair is generated at the client 12 (if such a key pair does not already exist) and the public key is included in the CSR that is sent to the IDM 16.

Once generated, the CSR is sent to the IDM 16 in message 24. By sending the CSR (including the public key of the client 12) to the IDM 16, the client 12 is asking the IDM (acting as a certificate authority) to generate a digital certificate that binds the identity of the client 12 with the public key included in the CSR 23.

In addition to the public key that the client 12 wants to be included in a digital certificate, the CSR may include information regarding the attributes the user wants to include in the requested certificate. A user may be able to use the GUI 14 to indicate information that should be included in the digital certificate. By way of example, a user may able to select or deselect pre-defined attributes and extensions that will be contained in the certificate. Some attributes/extensions may not be modifiable by the clients (e.g. "age >18"). It may be possible to change other attributes/extensions (e.g. nickname="Bugs Bunny" instead of "John Doe").

On receipt of the CSR, the IDM 16 communicates with the database 18 to obtain information that should be included in the digital certificate, such as requested user attributes (see message 26). The IDM may verify attributes specified by the client 12 in the CSR against data stored in the database 18 and/or against a configurable IDM rule-set/policy (e.g. if age>18 is included in the CSR, sign only if this can be verified by data stored in the database). Additionally, the IDM system may be able to add further extensions and constraints to the client certificate.

Now, on the basis of the identity information confirmed at step 22, the public key provided in the CSR, and any requested attribute data obtained from the database 18, the IDM 16 generates a digital certificate at step 27. The digital certificate binds the identity, public key and attribute data together by signing the data with the private key of the IDM. The certificate is generally sent together with the unencrypted public key for the certificate authority such that any entity can read the encrypted certificate. The key is used, however, to verify the validity of the certificate (i.e. to check that the certificate has been signed by the certificate authority).

The digital certificate signed at step 27 is provided to the client 12 (in message 28) and may optionally be stored in the database 18 (message 30).

The client 12 may be implemented as a software module and may be provided either on the client hardware directly or on e.g. a SIM card or on a so-called IDM Satellite. An IDM satellite may, for example, be provided in a removable form, for example as a memory stick (such as a USB stick). In such an embodiment, it is possible for the private key of the client to be stored on the memory stick together with the digital certificate. Such an arrangement enables the memory stick (including the identification information) to be transportable. The IDM Satellite may be password secured (or some other security mechanism may be provided) in order to avoid easy access of others to the stored certificates and corresponding private keys (e.g. if the IDM satellite was lost or stolen).

In use, the client 12 enforces SSL communication towards IDM 16. The client 12 has stored IDM server certificate and checks the certificate received from IDM against it. If they are different, the client 12 checks if the certificate is signed by IDM (acting as a certificate authority). If the certificate is not signed by IDM, the communication session is aborted.

The server certificate and the root CA certificate is stored and available for authentication during connection set-up to the IDM system. This prohibits DNS poisoning attacks and client credential fishing in insecure environments.

The present invention enables multiple certificates to be issued by the IDM 16 for a single user. Moreover, at least some of those certificates may differ from one another. The IDM can manage such multiple certificates and a user can decide which certificate is most appropriate to a particular use case (or can request a new certificate for a new use case). Certificate management may enable a user to delete a valid certificate and/or revoke them in the same convenient way. This functionality may be controlled by the user via the GUI 14.

The IDM 16 (or the database 18 associated with the IDM 16, if any) may be used as a mechanism for the secure storage of the certificates of one or more clients.

Optionally, an IDM client (such as the client 12) can generate a client certificate signing request on his own and send it to the IDM for validation (attributes/Date Of Expiry/extensions etc.) without using the above described software support.

The IDM 16 may include at least some of the following functionality.

Bootstrapping a PKI with authorized members of the IDM community after successful registration in the (server authenticated) SSL tunnel Secure storage and administration of client certificates Enabling certificates to be deleted by the user Enforcing mutual SSL authentication as soon as the IDM system knows that the client is in possession of any valid client certificate.

Signing certificates on request from a user

Certificate revocation of client certificates

Federation with other PKIs

Figure 4:
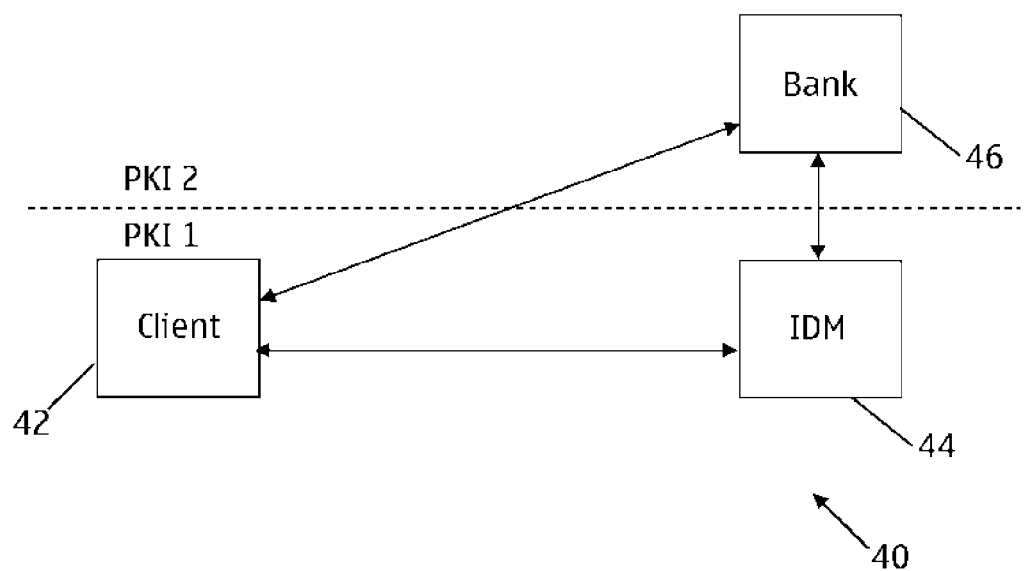
FIG. 4 is a block diagram of a system in accordance with an aspect of the present invention.

Other PKIs can query the IDM for validity of certificates generated by the IDM community via SAML Verifying client attributes claimed in a CSR FIG. 4 is a block diagram of a system, indicated generally by the reference numeral 40, in accordance with an aspect of the present invention. The system 40 provides shows an exemplary interaction between an IDM-based PKI system and another PKI system (in this example, a PKI system used by the user's online bank).

The system 40 includes a client 42 and IDM 44 similar to the client 12 and IDM 16 described above respectively. As described above, the IDM 44 acts as a certification authority for the client 42. Accordingly, the client 42 and the IDM 44 form part of a PKI system (labelled PKI 1 in FIG. 4).

As shown in FIG. 4, the client 42 is in two-way communication with the IDM 44 and is also in two-way communication with a bank 46. The bank 46 is in a separate PKI system (labelled PKI 2 in FIG. 4).

In use, the bank 46 receives a digital certificate for the client 42 either from the client or from the IDM 44. The digital certificate is signed by the IDM 44 and, if the bank trusts the IDM, then the bank can use the public key for the client 42 included in the digital certificate to decrypt messages sent by the client 42 to the bank 46 that are signed using the private key of the client.

In one embodiment of the invention, the bank 46 may store a number of digital certificates received from the IDM 44 and periodically receives a certificate revocation list (CRL) from the IDM indicating the digital certificates issued by the IDM that are no longer valid. When the bank receives a message from the client, the bank 46 can determine whether or not the IDM considers the digital certificate for the client to be valid. Of course, it is also open to the bank to communicate directly with the IDM 44 to validate single client certificates at the IDM on a one-by-one basis.

Certificates will be revoked by the IDM 44 if the client 42 deletes the certificate himself or the client attributes/extensions embedded in the certificate have become obsolete. The attributes might become obsolete, for example, because the owner of the attribute has become 18 years old, the owner is not trustworthy any more or the address of the owner changed.

If the bank 46 does not accept the client certificate any more, the client 42 could be forced to contact the IDM system 44 directly to request the generation of a new, up-to-date certificate for this specific use-case (e.g. buying at amazon.de). Another option would be for the bank 46 to accept the client certificate if the correct SAML token is in the target URL.

As discussed in detail above, the present invention enables digital certificates to be issued and managed by an IDM. Digital certificates generated in accordance with the principles of the present invention can be used for many different purposes. Typical use cases include:

Payment requests, where the client certificates could be used to sign the payment requests;

Banking applications where a high level of security is mandatory (mutual authentication);

In an Internet café, where the end device is not under control of the user;

Whenever there is the need for transportable certificates; and

To provide an easy and secure way of administrating VPN access.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

What is claimed:

1. A method for provisioning user certificates in a system comprising a user-controlled client, comprising:
   generating, by a client, a public and private key pair for a user;
   generating, by the client on behalf of the user, a certificate signing request using the public and private key pair, wherein the certificate signing request comprises zero or more attributes selected by the user, at least one attribute that does not require input from the user, and the public key of the user;
   sending, by the client, the certificate signing request to an identity management system connected to a database containing the attributes of the user; and
   receiving a digital certificate from the identity management system in response to the certificate signing request.

2. The method according to claim 1, further comprising: requesting authentication of the user at the identity management system.

3. The method according to claim 1, wherein the received digital certificate binds the identity of the client with the public key and the attributes by signing the digital certificate with a private key of the identity management system.

4. The method according to claim 1, further comprising:
   storing, by the client, a server certificate for the identity management system;
   checking the received digital certificate against the server certificate; and
   when the received digital certificate and the server certificate are different and the received digital certificate is not signed by the identity management system, aborting a communication session with the identity management system.

5. An apparatus, comprising:
   at least one processor; and
   at least one memory comprising computer program code,
   the at least one memory and computer program code configured, with the at least one processor, to cause the apparatus at least to
   generate a public and private key pair for a user;
   generate, on behalf of the user, a certificate signing request using the public and private key pair,
   wherein the certificate signing request comprises zero or more attributes selected by the user, at least one attribute that does not require input from the user, and the public key of the user;
   send the certificate signing request to an identity management system connected to a database containing the attributes of the user; and receive a digital certificate from the identity management system in response to the certificate signing request.

6. The apparatus according to claim 5, wherein the at least one memory and computer program code are further configured, with the at least one processor, to cause the apparatus at least to:
request authentication of the user at the identity management system.

7. The apparatus according to claim 5, wherein the received digital certificate binds the identity of the apparatus with the public key and the attributes by signing the digital certificate with a private key of the identity management system.

8. The apparatus according to claim 5, wherein the at least one memory and computer program code are further configured, with the at least one processor, to cause the apparatus at least to:
store a server certificate for the identity management system;
check the received digital certificate against the server certificate; and
when the received digital certificate and the server certificate are different and the received digital certificate is not signed by the identity management system, abort a communication session with the identity management system.

9. A computer program product embodied on a non-transitory computer-readable medium, the computer program product configured to control a processor to perform operations, comprising:
generating, by a client, a public and private key pair for a user;
generating, by the client on behalf of the user, a certificate signing request using the public and private key pair,
wherein the certificate signing request comprises zero or more attributes selected by the user, at least one attribute that does not require input from the user, and the public key of the user;
sending, by the client, the certificate signing request to an identity management system connected to a database containing the attributes of the user; and
receiving a digital certificate from the identity management system in response to the certificate signing request.

* * * * *